Aug. 7, 1928.　　　　　　　　　　　　　　　　1,679,386
D. TENNEY
PRESERVATION OF FOOD PRODUCTS
Filed Dec. 20, 1920　　　4 Sheets-Sheet 1

Aug. 7, 1928.
D. TENNEY
1,679,386
PRESERVATION OF FOOD PRODUCTS
Filed Dec. 20, 1920
4 Sheets-Sheet 2
Fig.2.
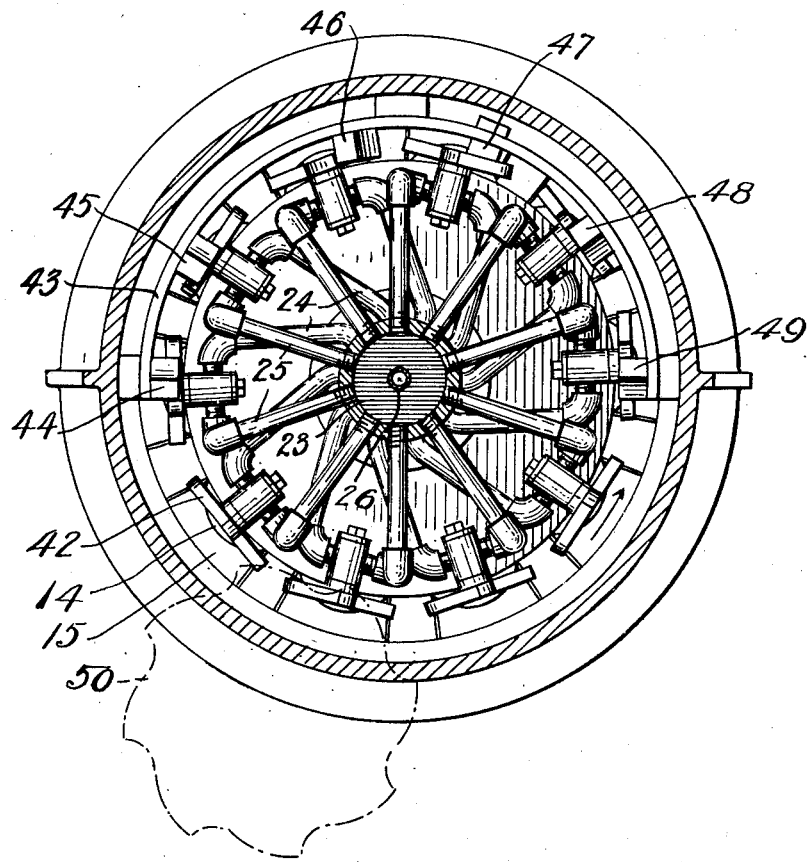
Fig.4.
Fig.5.
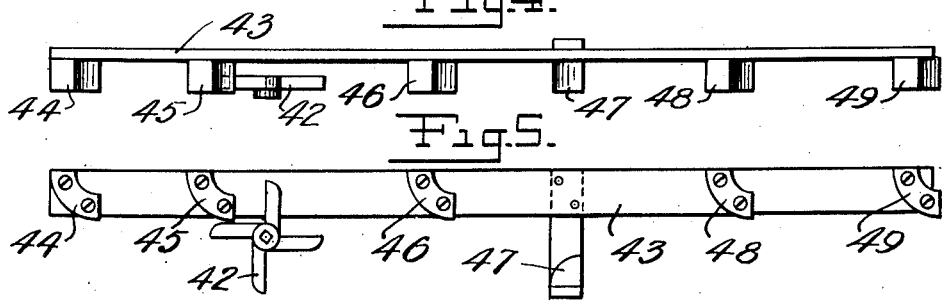
Inventor
Dwight Tenney
By his Attorney
Frank J. Stent

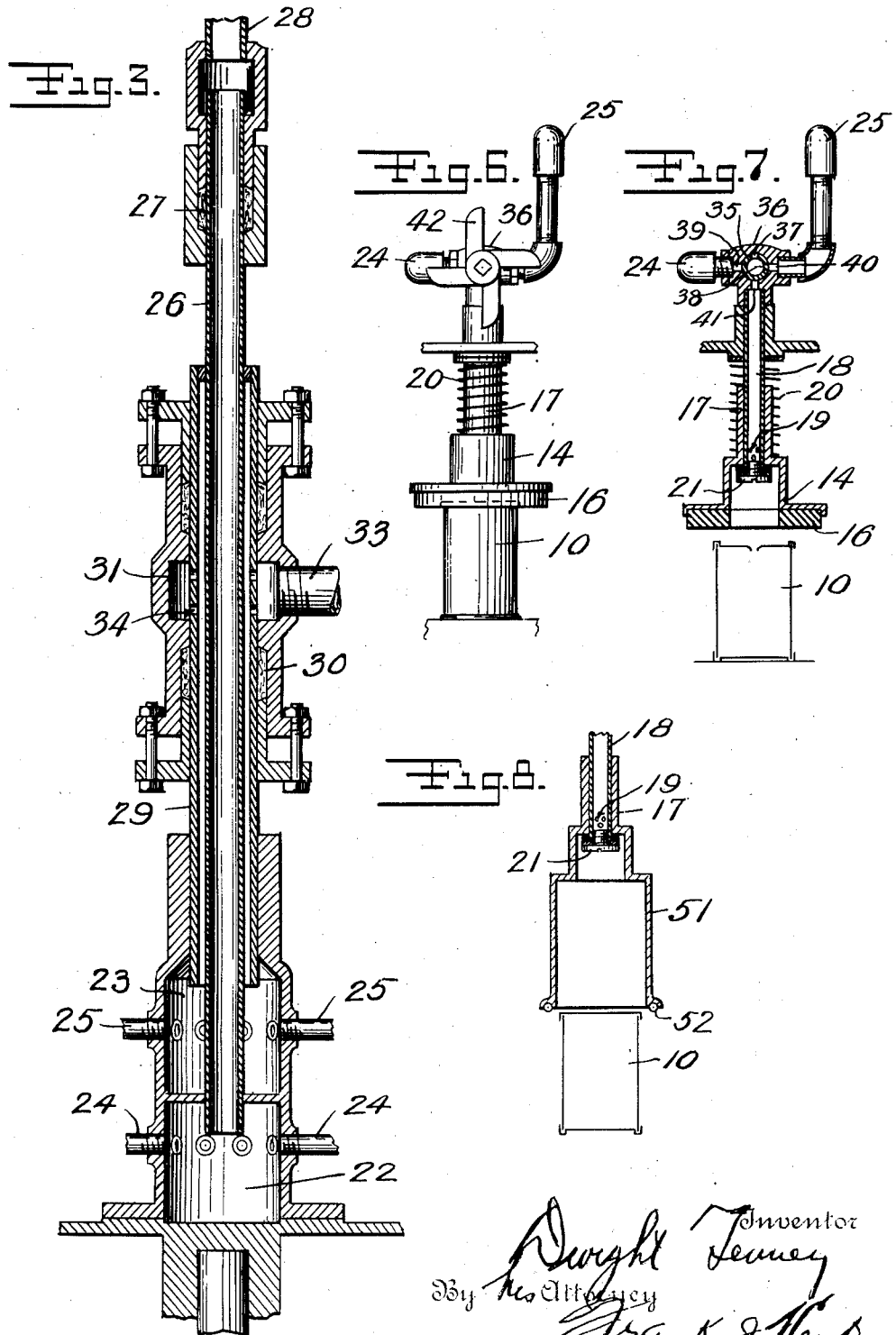

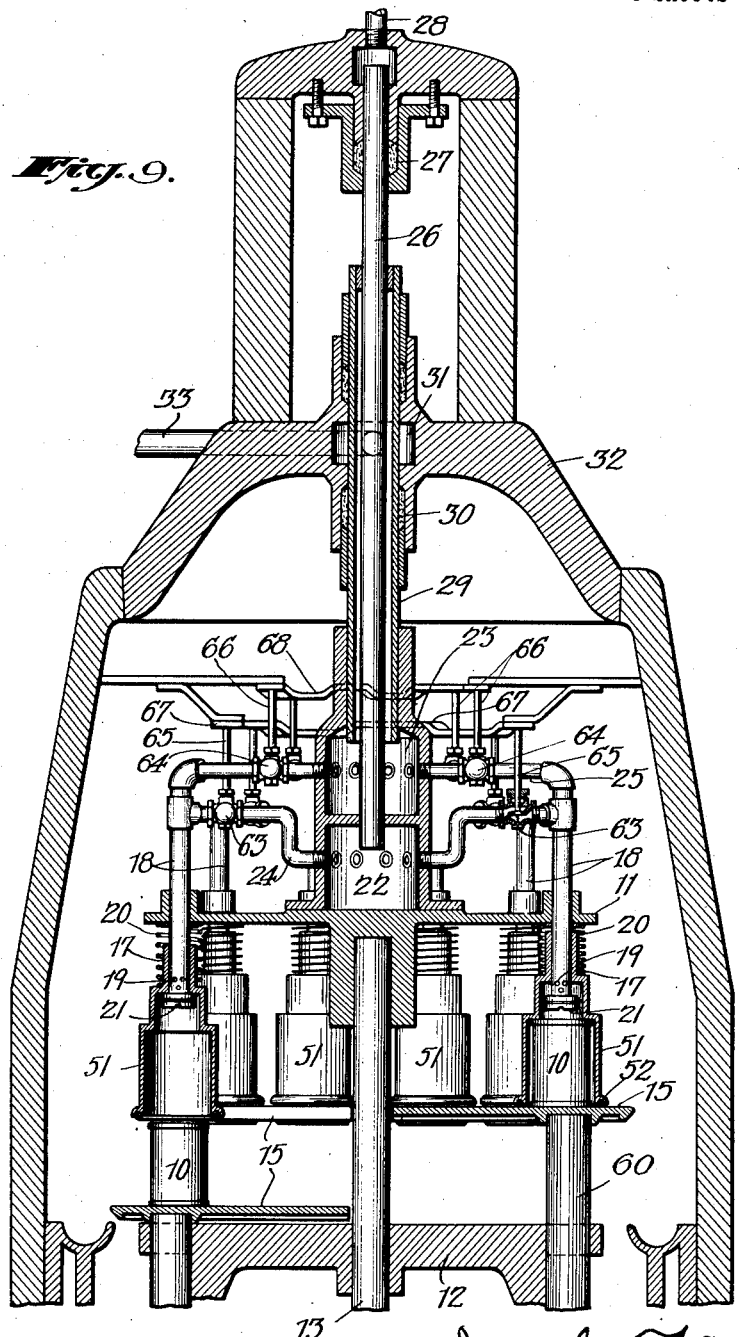

Patented Aug. 7, 1928.

1,679,386

UNITED STATES PATENT OFFICE.

DWIGHT TENNEY, OF BROOKLYN, NEW YORK, ASSIGNOR, BY MESNE ASSIGNMENTS, TO RECTOR-TENNEY COMPANY, OF NEW YORK, N. Y.

PRESERVATION OF FOOD PRODUCTS.

Application filed December 20, 1920. Serial No. 431,891.

This invention relates to the packing and preservation of various materials, such as food products and particularly material in the nature of moist comminuted coconut.

The objects of the invention are to effect the proper preservation of the material and to accomplish this in an efficient and entirely practical way.

Considered in one aspect, the invention consists of apparatus by which the material is packed and preserved in the desired stabilized state by first subjecting it to vacuum or suction to remove air and other contaminating or undesirable elements and is then sealed in an atmosphere of dehydrated and sterile air, alcohol fumes or some inert gas, such as nitrogen. To insure the desired results, the exhausting and gas supplying steps may be repeated a number of times.

In the drawings accompanying and forming a part of this specification I have disclosed a typical and desirable form of the apparatus, but wish it understood that the same may be modified in various respects without departing from the true spirit and scope of the invention as hereinafter defined and claimed.

In the drawings referred to:

Figure 2 is a cross sectional view of the same as taken on substantially the plane of line 2—2 of Figure 1.

Figure 3 is an enlarged broken sectional view of the vacuum and revoluble gas supplying connections.

Figures 4 and 5 are plan and side elevation developments of the actuating mechanism for the vacuum and gas controlling valve.

Figures 6 and 7 are side and vertical sectional views respectively of the control valve and coupling mechanism.

Figure 8 is a broken sectional view illustrative of a modified form of coupling.

Figure 9 is a broken vertical sectional view generally similar to Figure 1, illustrating a modified form of valve mechanism.

Figure 1:
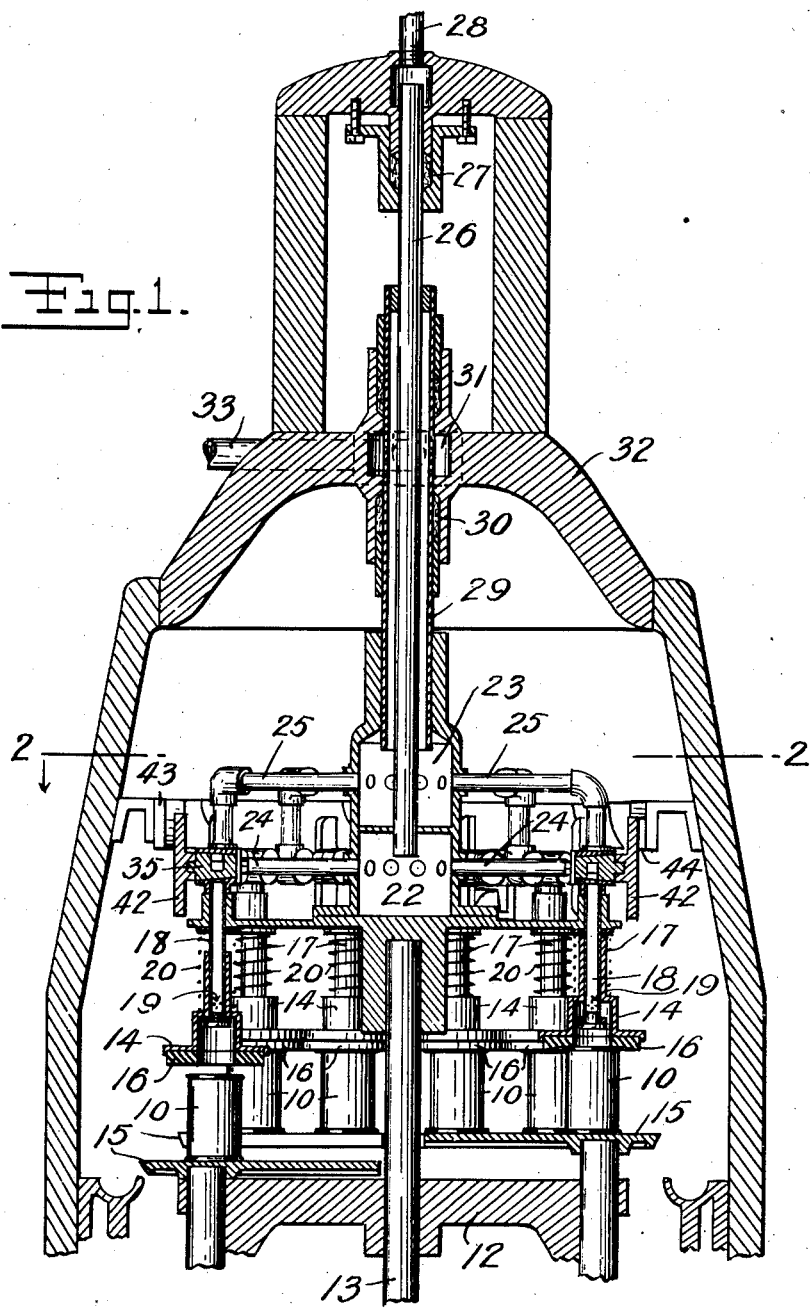
Figure 1 is a vertical sectional and partly broken view of the active portions of the machine.

In the machine herein disclosed, the coconut or other material under treatment is charged in cans or containers 10 and these, carried by a rotating head or turret, are subjected, in the course of rotation of such head, alternately to the vacuumizing and gasifying steps above referred to.

The turret I have shown as consisting of upper and lower heads 11 and 12 carried by the supporting shaft 13. The upper head carries a series of couplings or caps 14 for sealing engagement with the containers and the lower head carries a series of lifters 15 mounted on the upper ends of rods 60 which are reciprocated vertically by well-known means to carry the containers up into proper sealing engagement with the mouths of the couplings, which latter for the purpose, may have sealing gaskets such as I have indicated at 16.

In the particular construction shown, the neck portions 17 of the couplings slidingly fit over the hollow tubular heads 18 and operate as valves in their sliding movements thereover to cover and uncover the perforations 19 in such tubular heads. The couplings may be thrust downward so as to cover the perforations or ports 19, as indicated at the left in Figure 1, by means of suitable springs 20, the downward motion of the couplings being limited in this instance by the plugs 21 closing the lower ends of the heads and having annular outstanding shoulders as shown to serve as limiting stops, and valve seats.

The suction and gas connections to the several couplings include the suction and gas chambers 22 and 23 respectively carried by the upper head and from which the pipe connections 24 and 25 radiate to the various couplings.

The chamber 22 is connected with a vacuum pump or suitable suction producing means by a pipe 26 concentrically supported on the turret and having a suitable sliding joint at 27 with the stationary pipe connection 28, and the chamber 23 similarly is connected with a gas supply source by means of a concentrically located pipe 29 surrounding the first pipe and having a rotating connection at 30 with the boxing 31 which is supported relatively stationary in the frame or casing 32 and is connected with the gas source by suitable piping such as indicated at 33 in Figure 3. Pipe 29 has suitable perforations or openings 34 therein within the chamber of the boxing 31 so that the gas can pass freely thereinto.

The couplings are automatically connected with the vacuum and gas supply sources at the proper moments in the rotation of the turret by valves which may be of the three-way type, and consisting in Figures 1 to 7 of the present disclosure of valve plugs 35 journaled in the valve casings 36 and each having two rectangularly related ports 37, 38 to register at different times with the suction ports 39, the gas supply ports 40 and the coupling ports 41. In the instance shown in Figure 7, the valve is turned so as to carry both ports out of register with the coupling port 41 and consequently the coupling at such times is disconnected from both the suction and the gas.

The distributing or control valves described are turned by means of the star wheels 42 on the hubs of the valves engaging with properly located cams or shoulders disposed about the axis of the turret. These shoulders I have illustrated in Figure 2 as carried by a rail 43 extending substantially half way about the turret and arranged, the first one, 44, (Figure 5) when engaged by one of the arms of the star wheel to turn the valve to a preliminary or starting position; the second one, 45, serving to rotate the valve far enough to open up the suction port to the coupling; the next trip shoulder, 46, turning the valve to open up the nitrogen supply; the fourth trip, 47, rotating the valve backwardly to again connect up the suction line; the fifth trip, 48, rotating the valve forwardly to the nitrogen supplying position, and the sixth trip, 49, turning the valve forwardly to the closed position such as indicated in Fig. 7.

In operation the cans or containers, which have been suitably filled or charged with the coconut or other food product, are fed to the turret in position beneath the couplings as by means of a feed wheel such as I have indicated in dotted lines at 50 in Figure 2. At the first station, the lifter elevates the can into engagement with the mouth of the coupling, forcing up the coupling sleeve as shown at the right in Figure 1, so as to open the coupling valve. At this time the star wheel is turned by engagement with the first trip 44 into the preliminary position. On the continued movement of the turn-table, the valve will be turned by engagement of one of the arms of the star wheel with the second trip 45 to open up the suction connection. After this, "vacuumizing" operation, the valve is turned by the third trip 46 to open up the nitrogen connection. The nitrogen or other gas is then supplied under sufficient pressure to fill the can, this flow of nitrogen is effect serving to break the partial vacuum. In the course of the further motion of the turret, the valve is turned back by means of the trip 47 to momentarily connect it with suction, which causes the nitrogen or other gas to in effect flush out the can and carry off with it any air which might have remained therein. At the next station, the valve is turned by the trip 48 to again couple up the container with the nitrogen or other gas supply, after which the valve is closed and the can is suitably sealed as by means of sealing mechanism now in common use. The repeated exhausting lowers the percentage of initial atmosphere by the law of dilution and may enable the use of a lower degree of suction than would otherwise be possible.

Where the cans are relatively small, the possibility of collapse of the can on the application of suction is relatively remote and the suction mouth may, therefore, be made to engage directly with the head of the can, as I have clearly indicated in Figures 6 and 7. Where, however, the container is relatively large or flimsy in character, the possibility of collapse becomes greater and in this event I may employ a coupling like that shown in Figure 8 and comprising a cup or housing 51 arranged to entirely cover and enclose the container, said cup having a gasket 52 at its lower end for engagement with the can support so that pressure both inside and outside the can is substantially equal.

It will be apparent that my invention is not limited to the particular use herein disclosed and might be employed not only for packing the product in such a way as to stop oxidation, but might also be used for the benefit or improvement of the product; for example, in putting up certain kinds of meat it would be highly advantageous to pack the same in smoky fumes and with certain types of food containing delicate essential oils, alcoholic vapors might be used with great benefit to the product.

It will be understood, therefore, that the invention is of wider application and scope than as actually disclosed and I further wish it understood that the terms employed in the disclosure and claims are used in a descriptive rather than in a limiting sense, except for such limitations as may be required by the prior art.

The structure may be modified in various ways. For instance, I have found that in place of a single rotary valve controlling both suction and gas supply, somewhat better results are obtained by using valves of the poppet type, as shown in Figure 9, one 63 for the suction connection and one 64 for the gas supply, at each coupling, said valves having operating stems 65, 66, engaging separate cams 67, 68 in the rotation of the turret. With valve mechanism of this sort there is less leakage and a more flexible control of the air valves is obtained.

The cam tracks are provided with a plurality of cams for operating the gas valves and a plurality of cams for operating the suction valves, the cams being so arranged that the valves are opened alternately a plurality of times during a single rotation of the turret. It is obvious that the cams may be designed so that the gas valves are operated in any desired timed relation to the operation of the suction valves.

What I claim is:

1. A machine of the character disclosed comprising a rotatable turret adapted to carry a container, separate gas supply and suction chambers in the turret, a sliding bell adapted to form a closed space around said container, gas supply and suction lines leading from the chambers to said closed space, a valve in each of the lines, and cam means adapted to actuate the valves.

2. A machine of the character disclosed comprising a rotatable turret adapted to carry a container, separate gas supply and suction chambers in the turret, a sliding bell adapted to form a closed space around said container, gas supply and suction lines leading from the chambers to said closed space, a valve in each of the lines, and cam means for opening each valve a plurality of times in one rotation of the turret.

3. A machine of the character disclosed comprising a rotatable turret adapted to carry a container, separate gas supply and suction chambers in the turret, a sliding bell adapted to form a closed space around said container, gas supply and suction lines leading from the chambers to said closed space, a valve in each of the lines, and cam means for operating the valves, said cam means being arranged to open the gas valve just before closing the suction valve.

4. In a machine of the character disclosed, a rotating turret, separate gas supply and suction chambers in the turret, separate gas supply and suction lines leading from said chambers, a head connected to said lines, a cap slidably mounted over said head, valves in the gas supply and suction lines, and cam means cooperating with said valves to alternately open the cap to the suction chamber and to the gas supply chamber each a plurality of times in one rotation of the turret.

5. In a machine of the character disclosed, a rotating turret, valved couplings carried by said turret, vertically movable container supports beneath said couplings and arranged to actuate the valves of said couplings in the rotary movement of the turret, separate gas supply and suction chambers in the head of the turret, gas and suction connections from said chambers to the several couplings, a casing over the head of the turret, cam means carried by said casing about the peripheral portion of the turret, valves in the gas supply and suction connections operable by the cam means in the travel of the turret to alternately open the couplings to the suction chamber and to the gas supply chamber each a plurality of times in one rotation of the turret and concentric suction and gas supply conduits extended down through the casing over the top of the turret to the suction and gas supply chambers respectively.

In testimony whereof I affix my signature.

DWIGHT TENNEY.